United States Patent Office 3,107,127
Patented Oct. 15, 1963

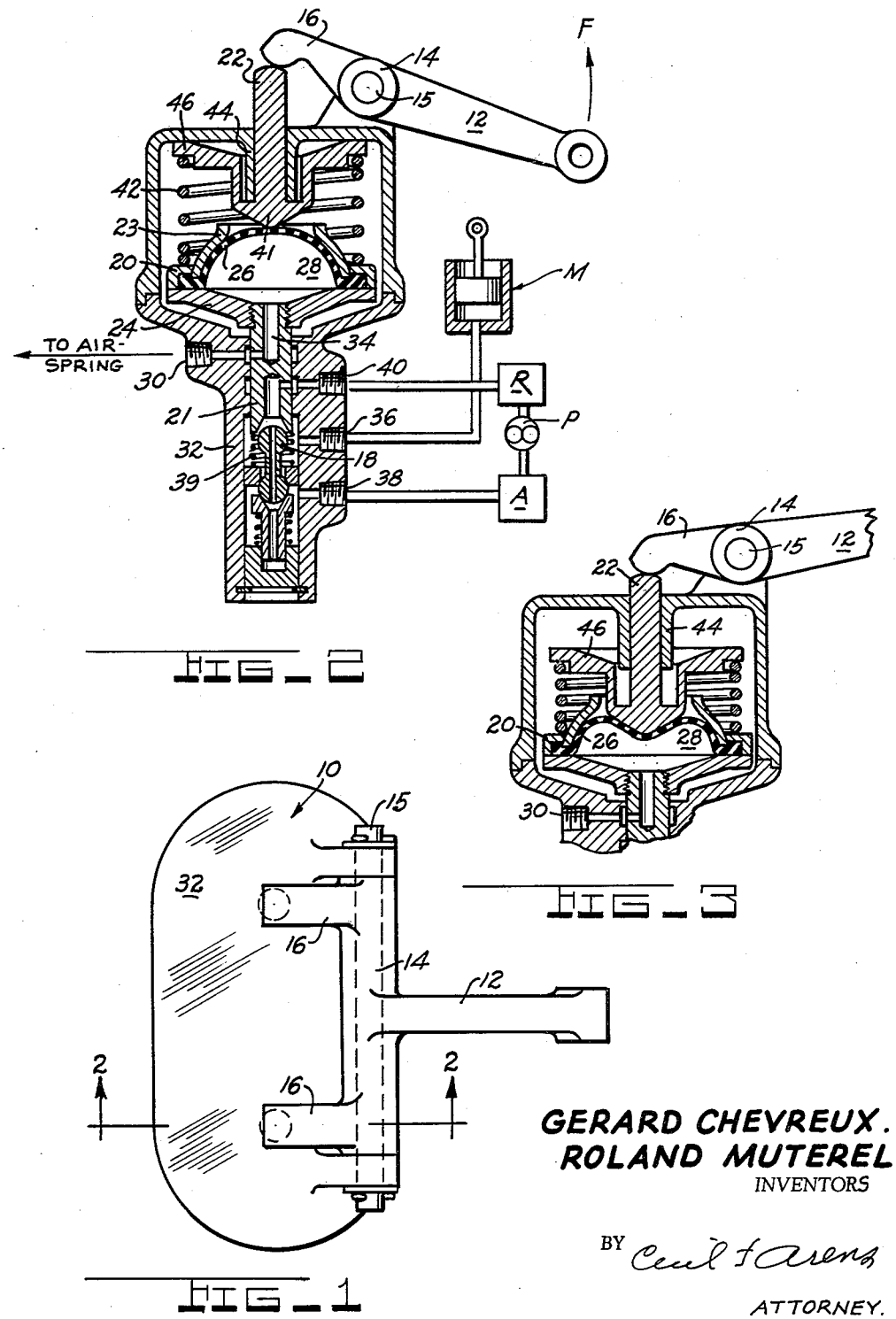

3,107,127
BRAKE PROPORTIONING VALVE
Gerard Chevreux, Colombes, and Roland Muterel, Saint Denis, France, assignors to Société Anonyme D.B.A., Paris, France, a company of France
Filed July 3, 1961, Ser. No. 121,634
Claims priority, application France Jan. 27, 1961
4 Claims. (Cl. 303—22)

The present invention relates to automotive braking systems; and more particularly to fluid pressure braking systems including a proportioning valve which distributes the braking effort between the axles of the vehicle in accordance with the load on the axles of the vehicle.

An object of the present invention is the provision of a new and improved valve for automotive fluid pressure braking system which distributes the braking effort between the axles of the vehicle in a manner varying with the load on the axles so as to produce equal sliding tendencies for all wheels under substantially all load and road conditions.

Still another object of the invention is the provision of a brake control valve responsive to the pressure in fluid pressure suspension units of the vehicle for distributing the braking effort between the axles of the vehicle.

An overall object of the present invention is the provision of a new and improved brake control valve for a braking system of the above described type, which is simple in design, foolproof in operation and economical to manufacture and which however is effective throughout the whole range of load conditions.

Further objects and advantages of the present invention will become apparent to those skilled in the art to which the invention relates from the following description of an embodiment described with reference to the accompanying drawing, in which:

FIGURE 1 is a top plan view of one form of brake proportioning valve embodying the invention;

FIGURE 2 is a sectional view of the valve in rest condition incorporated in a hydraulic system schematically illustrated, the section being taken on the line 2—2 of FIGURE 1.

FIGURE 3, similar to FIGURE 2, is a part view of the valve in energized condition.

Referring to FIGURE 1 of the drawing, the reference numeral 10 designates a proportioning valve for use in a power braking system and adapted to control the braking pressures in two braking circuits which may be respectively associated with front and rear axles (not shown) of an automotive vehicle. Although the valve illustrated is adapted to deliver fluid braking pressure to two braking circuits only, any number of separate circuits may obviously be provided. Actuating means for the valve comprises an actuating arm 12 formed on a forked lever 14 carried by the housing 32 of the proportioning valve through a pivot pin 15. The lever 14 is formed with two furcations 16 each adapted to operate a valve assembly associated with one braking circuit, as will be apparent hereinafter.

One of the valve assemblies is illustrated in longitudinal cross-section in FIGURE 2. Each valve assembly comprises a control valve 18, a force metering device 20 secured to the control valve actuating member 21 and a plunger 22 in abutting connection with one of the furcations 16 and slidably received in the housing. The metering device of FIGURE 2 comprises a cup-shaped casing 20 secured to the control valve actuating member 21 by means of a suitable connection, e.g. a threaded connection, and a flexible diaphragm member 26 cooperating with the end portion of plunger 22. The casing 20 is in two assembled parts and comprises an annular upper flange 23 and a lower part 24 connected to the actuating member. The flange 23 operates as a rolling abutment for the diaphragm 26 having its sidewalls clamped between the parts 23 and 24 of the cup-shaped member 20 retained in assembled relation by a suitable fastening structure such as machine screws (not shown). The lower part 24 of cup-shaped member 20 and the diaphragm 26 limit a compartment 28 which is communicated to air springs (not shown) supporting the axle associated with the braking circuit through the requisite pipes, a control port 30 in the wall of housing 32 and an internal passage 34 in the actuating member 21 of the control valve. The same pressure will accordingly prevail at all times in the compartment 28 and in the suspension springs associated with the same axle.

The valve 18 may be of any type adapted to provide a reaction opposing its actuation with a force in direct proportion to the fluid pressure delivered to a control port 36 connected to a brake motor M adapted to exert a braking force on the wheels of the axle upon admission of pressure fluid in the motor. Referring to FIGURE 2, the hydraulic control valve shown is of the general type disclosed and claimed in the Hruska Patent No. 2,752,947 assigned to Bendix Aviation Corporation, modified to deliver to the control port 36 a hydraulic pressure in direct proportion to the manual actuating force on member 21. Since however the valve per se is not part to the invention and may be of any type providing a "feel," no description thereof is deemed necessary. In those applications where the pipe between control port 36 and brake motor M is of substantial length, a type of valve adapted to deliver a "feel" in proportion to the pressure in motor M rather than in port 36 may be preferred to improve brake responsiveness. A valve of that type is disclosed and claimed in French patent application Ser. No. 832,527 filed on July 8, 1960 in the name of Société Anonyme D.B.A. For an understanding of the invention, it is sufficient to remember that the valve 18 is adapted to communicate control port 36 either to inlet port 38 (to which pump P and accumulator A deliver fluid pressure) or to exhaust port 40 (from which fluid returns to reservoir R) and to regulate control port pressure at a value for which the corresponding "reaction" force against the actuating member 21 balances the actuating force transmitted through the metering device 20. Resilient valve return means, schematically illustrated as a spring 39, exert a force biasing the valve toward a normally "closed" position, where communication is open between the control and exhaust ports and is closed between the control and inlet ports.

The end portion 41 of plunger 22 has a tapered form so that progressive engagement between the plunger and diaphragm takes place upon downward movement of the plunger. By using a proper degree of taper it is possible to achieve the desired metering effect, i.e. the desired plunger travel versus control pressure. If the plungers have identical angles of taper, substantial identity of all the plungers-diaphragm contact areas may also be obtained, while somewhat erratic variations would be experienced with flat-ended plungers.

A spring 42 is compressed between the metering device 20 and plunger 22 and fulfills several functions. In rest condition spring 42 maintains the plunger 22 against an abutment ring 44, even if no pressure is available in compartment 28 (parked vehicle). Ring 44 is preferably integral with the housing, slidably receives plunger 22 and maintains it properly centered. An additional function of spring 42 is to transmit a thrust additional to that transmitted through the metering device from the plunger 22 to the actuating member 21 of valve assembly 18, in order to compensate for the unsprung weight of the corresponding axle; such weight should not be neglected in the design, particularly for braking the unloaded vehicle, since the weight of a tandem rear axle on a truck will often exceed 1 ton. Provision of a spring 42 with sufficient stiffness also makes it possible to use the proportioning valve of the invention on a vehicle having one or several axles fitted with hybrid suspension, having pneumatic and mechanical suspension units.

It should however be borne in mind that the action of spring 42 on valve actuating member 21 biases the valve toward "open" position and tends to overcome the action of return spring 39. In order for spring 39 to maintain the valve assembly in closed condition at rest, its preload should be in excess of that of spring 42, even if the spring 42 is stiffer than spring 39.

Operation of the system is as follows: with the parts of proportioning valve 10 in the position shown in FIGURE 2, each valve assembly 18 is hydraulically balanced and is retained in "closed" condition by the action of spring 39. Communication is opened between ports 36 and 40 and cut-off between ports 36 and 38. When the operator exerts an actuating effort and moves arm 12 in the direction of arrow F (FIGURE 1), each furcation 16 will move the corresponding plunger 22 downwardly from the rest position of FIGURE 2. Relative movement occurs between each plunger 22 and the corresponding metering device 20 and each plunger will deform the associated diaphragm so that it partakes of the form shown in FIGURE 3. Since the travels of all the plungers are the same, the diaphragms are similarly folded up against the plungers although the pressures are different in the compartments 28. Since the "effective" abutting area is the same for each diaphragm, the forces which are transmitted to the valve actuating members 21 are in direct relation to the pressures in the respective compartments 28. If the valve assemblies 18 are of a type which exerts a reaction force in direct proportion to the pressure in the control port 36, each control pressure is regulated to a value in direct relation to the suspension pressure, so far as the action of spring 42 may be considered as of minor importance. That condition is only fulfilled for a vehicle axle having fluid pressure suspension springs exclusively, since in such case the spring 42 is designed for carrying a low proportion of the valve actuating force, and particularly when the load on the axle is close to the maximum value.

The provision of a compensating spring 42 having an increased stiffness in order to carry a notable force additional to that transmitted through diaphragm 26 does not change the operation of the valve assembly 18 in any way. It only alters the plunger travel-control pressure relation. With a suitably designed spring, braking pressure graduation through increasing travel of the actuating level 14 may be achieved in the current used range of braking pressures with substantially no lever travel above this range, the pressure being then controlled directly by the force on arm 12.

When the driver releases his action on arm 12, the reaction pressure on each valve assembly 18 and the force of the return spring 39 cooperate to move the actuating member 21 upwardly and to establish communication between control port 36 and exhaust port 40. The pressure in compartment 28 and the compression force of spring 42 bring back plunger 22 to the position in FIGURE 2 and maintain it in that position until arm 12 is again actuated.

The only embodiment shown illustrates a brake proportioning valve adapted to control the braking pressures in two circuits only, each of which is connected to a distinct control port 36, but it is clearly seen that any number of braking circuits may be provided while a single primary circuit is retained comprising return reservoir R, pump P and accumulator A. All inlet ports 38 will communicate together and with the accumulator, while all exhaust ports 40 will provide for return flow to the reservoir. In place of a closed center valve being used, it is also possible to provide an open center circuit on the condition that the valve assemblies are changed to a proper type.

Modified embodiments of the invention, not shown, may easily be designed by one skilled in the art, in which the ratio of the braking pressure to the suspension pressure is different for each valve assembly. In order to achieve that purpose, the taper of the end portions 41 of the plungers 22 should be different so that the effective area of the corresponding diaphragm for a given travel of lever 14 be different for each valve assembly. Although it has been shown in cooperation with air springs, the invention may also be adapted on a vehicle having hydro-pneumatic suspension units, or hybrid suspension.

From the foregoing description it should be apparent that there has been devised by our invention a brake proportioning valve so arranged as to proportionate the braking force on each axle to the effective load on the axle. Since the provision of pneumatic and mechanical paths of force transmission arranged in parallel between the driver actuated member and each control valve assembly makes it possible to adapt the invention either to purely pneumatic or to hybrid vehicle suspension structures, the invention will lend to numerous applications which were not accessible to prior structures in spite of the need for some form of brake repartition.

While the invention has been described in considerable detail, we do not wish to be limited to the particular constructions shown and described; and it is our intention to cover hereby all adaptations, modifications and arrangements thereof which normally come within the practice of those skilled in the art to which the invention relates.

We claim:

1. In a vehicle fluid pressure braking system including a fluid pressure source and a plurality of brake motor means, a brake proportioning valve comprising a manually controlled actuating member, a plurality of self-lapping control valve means each adapted to communicate said pressure source to a respective brake motor means, a plurality of control valve pressure reaction means each opposing actuation of a respective control valve means with a force in direct proportion to the pressure delivered to the respective brake motor means, and a plurality of graduating means each located between said actuating member and a respective control valve means to distribute a manual actuating force on said actuating member between said plurality of control valve means, each of said graduating means being communicated to a fluid pressure source and having a contact area with one of said actuating members and respective valve control means in proportion to relative travel therebetween and being constructed to transmit a force between said actuating member and the respective control valve means in relation to said contact area.

2. In combination with a vehicle having a plurality of axles each provided with fluid suspension means, a fluid pressure braking system including a fluid pressure source, a plurality of brake motor means each associated with a respective axle, and a brake proportioning valve, said proportioning valve comprising a manually controlled actuating member, a plurality of self-lapping control valve means each adapted to communicate said pressure source to the brake motor means on a respective axle and each having pressure reaction means opposing actuation thereof with a force in direct proportion to the pressure delivered to the respective brake motor means, and a plurality of graduating means each located between said actuating member and one of said control valve means and each communicated to the suspension means of the respective axle, each of said graduating means being constructed to transmit a force between said actuating member and the respective control valve means in relation to the travel of said actuating member.

3. In combination with a vehicle having a plurality of axles each supported by suspension means, a braking system including a fluid pressure source, brake motor means for each axle, and a brake proportioning valve, said valve comprising common brake actuating means, a plurality of control valves, means for connecting each of said control valves to a respective one of said motor means, reaction means in each said control valve for exerting a reaction force in direct relation to the pressure delivered to each of said respective brake motor means, a plurality of metering structures each located between said actuating member and one of said control valves for transmitting an actuating force to the latter, and means for subjecting each of said metering structures to a stress in relation to the load on a respective axle suspension means, each of said metering structures being so constructed as to transmit a force between the actuating member and its respective control valve in relation to the relative travel therebetween, whereby braking pressures in relation to the load on the respective suspension means are delivered to the said brake motor means for each axle.

4. A valve mechanism comprising:
   a housing having an inlet port and a control port;
   valve means controlling fluid flow between said ports;
   a pressure responsive means, which pressure responsive means includes an open end chamber, a diaphragm adapted to engage the inner walls of said open end chamber and close the open end chamber to form a variable volume chamber, a fluid communication means for conducting a variable pressure source to said chamber, and a means connecting said open end chamber to said valve means; and
   a manually operable means engaging said diaphragm whereby said diaphragm is rolled off said inner walls of said open end chamber to increase the effective area of said diaphragm on said manually operable means so that said valve may be controlled in accordance with said variable pressure source.

References Cited in the file of this patent
UNITED STATES PATENTS

| | | |
|---|---|---|
| 2,450,464 | Bent | Oct. 5, 1948 |
| 2,719,059 | Thomas | Sept. 27, 1955 |